United States Patent [19]

Meyer et al.

[11] Patent Number: 4,809,348

[45] Date of Patent: Feb. 28, 1989

[54] PROCESS AND DEVICE FOR SEQUENTIAL IMAGE TRANSFORMATION

[75] Inventors: Fernand Meyer, Veneux les Sablons; Jean-Claude Klein, Fontainebleau Cedex, both of France

[73] Assignee: Association pour la Recherche et le Developpement des Methodes et Processus, Paris, France

[21] Appl. No.: 894,123

[22] Filed: Aug. 7, 1986

[30] Foreign Application Priority Data

Aug. 7, 1985 [FR] France .................. 85 12120

[51] Int. Cl.⁴ ............................................ G06K 9/54
[52] U.S. Cl. .................................... 382/49; 382/54; 382/55
[58] Field of Search ............... 358/260, 284; 382/41, 382/43, 44, 45, 47, 49, 54–56

[56] References Cited

U.S. PATENT DOCUMENTS

| | | | |
|---|---|---|---|
| 4,060,713 | 11/1977 | Golay | 382/41 |
| 4,290,049 | 9/1981 | Sternberg et al. | 382/49 |
| 4,509,195 | 4/1985 | Nadler | 382/41 |
| 4,558,462 | 12/1985 | Horiba et al. | 382/43 |
| 4,641,356 | 2/1987 | Sternberg | 382/49 |
| 4,692,943 | 9/1987 | Dietzsch et al. | 382/8 |

OTHER PUBLICATIONS

Golay, Marcel, "Hexagonal Parallel Patern Transformations", *IEEE Trans. on Comp.*, vol. C-18, No. 8, Aug. 1969, pp. 733–740.

Mandeville, Jon, "Novel method for analysis of pointed circuit images", *IBM J Res Develop*, vol. 29, No. 1, Jan. 1985, pp. 73–86.

*Primary Examiner*—Leo H. Boudreau
*Assistant Examiner*—Jose L. Couso
*Attorney, Agent, or Firm*—Antonelli, Terry & Wands

[57] ABSTRACT

The transformation applies to images defined by pixels each presenting a characteristic, such as a brightness, defined by a digital value, with the pixels being distributed according to a matrix and their relations and distances established by a neighborhood graph. All or part of the image is explored according to a predetermined exploration mode and the value of each pixel is modified as a function of the values of a set of associated pixels, assuming their value in at least the image and being located inside a sliding window related to the pixel to be transformed, identical for all pixels and constituting a structuring element. The transformed version of each pixel is immediately substituted for the preceding value in an image memory. To implement the process, a device can be utilized having a morphological opening processor, an image memory and a morphological processor with rewrite processing.

17 Claims, 8 Drawing Sheets

FIG.4.
```
              5 5 5 5
           5 5 5 7 10 10 5
        5 5 5 7 10 10 12 14 12 7 5
     5 7 10 10 12 14 15 17 19 14 10 5
     5 10 12 14 17 19 20 19 14 12 7 5
     5 5 7 12 14 19 20 17 12 7 5
           5 7 12 17 15 14 10 5
           5 12 12 10 7 5
           5 7 7 5 5 5
              5 5
```
FIG.5.
```
              5 5 5 5
           5 5 5 7 10 10 5
        5 5 5 7 10 10 12 14 12 7 5
     5 7 10 10 12 14 15 17 19 14 10 5
     5 10 12 14 17 19 20 19 14 12 7 5
     5 5 7 12 14 19 21 17 12 7 5
           5 7 12 17 17 14 10 5
           5 12 |99 99| 10 7 5
           5 17 |99 99| 5 5
              5 5
                      Y(B)
```
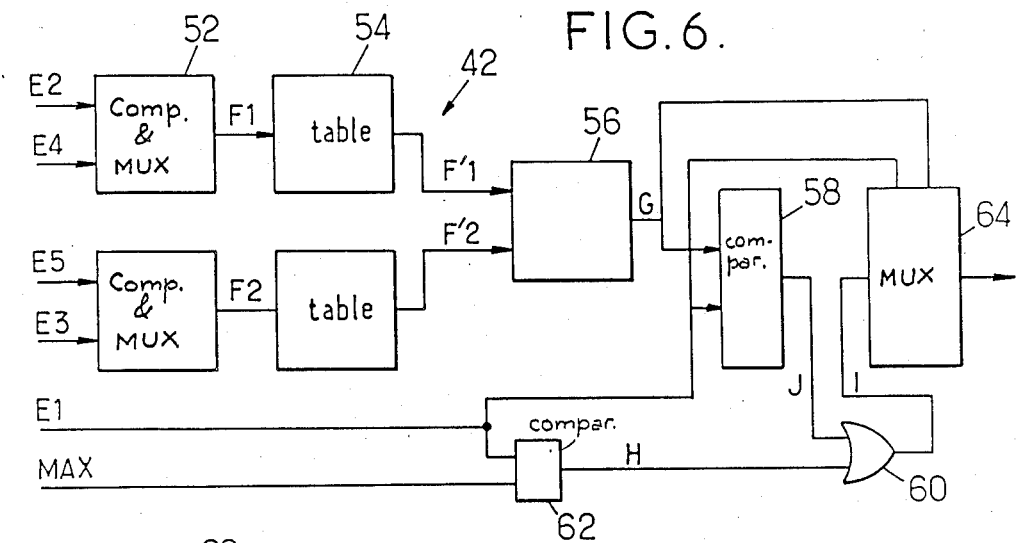
FIG.6.
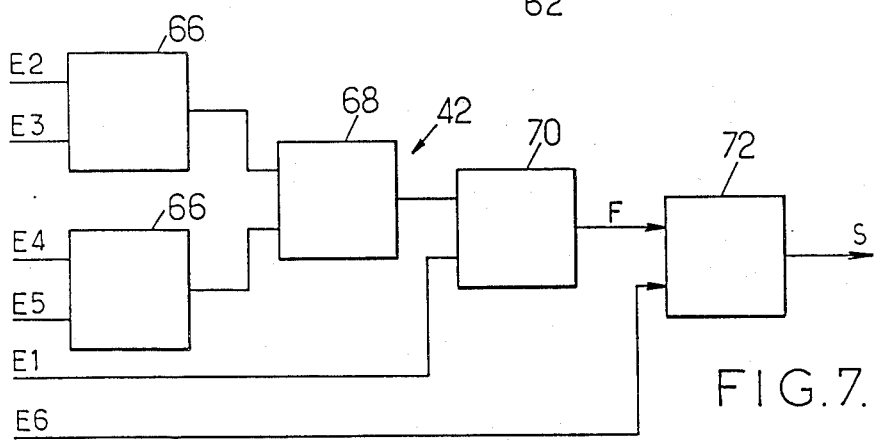
FIG.7.

PROCESS AND DEVICE FOR SEQUENTIAL IMAGE TRANSFORMATION

This application is related to co-pending Application Ser. No. 894,192, filed Aug. 7, 1986, and is assigned to the same assignee as the present application.

BACKGROUND OF THE INVENTION

The invention pertains to the domain of the processing of images defined by pixels each presenting a characteristic, such as a brightness, defined by the digital value of a function. More specifically, it pertains to a process for the sequential transformation of images, according to which a mode is defined for the scanning of all or part of the image, and the value of each point is modified as a function of a set of associated pixels taking on their values in one or several images and being located within a sliding linear or surface window related to the pixel to be transformed, identical for all pixels and constituting a structuring element. It can be applied in all areas of image analysis and especially in those of pattern recognition and industrial product display, especially in robotics.

Sequential image transformations have been known for a long time. For example, a description can be found in the article by A. Rosenfeld et. al. "Sequential operations in digital picture processing: J, ACM, Vol 13, No. 4, 1966, pp. 471–494.

To facilitate the understanding of the invention, definitions will be first be given for sequential transformations and the terminology which will be adopted, which is that currently utilized in the area of digital image processing.

A digitized image is comprised of a matrix of pixels having m lines and n columns. Each pixel has a value $a_{ij}$ belonging to a finite family of values $v_1, \ldots, v_k$. In practice, $k=2^s$ is adopted, with s being a whole number, (which signifies that each value is represented by a number of s bits and that $2^s$ levels of quantification are available).

The neighboring pixels of each given pixel will be defined by a neighborhood graph, examples of which will be given below, and which will naturally be different depending on whether the frame utilized is square or hexagonal and on the degree to which the notion of the neighborhood is extended.

An operation on a digitized image will be constituted by a function transforming the matrix of the image into another matrix. The most general function of this type thus has m×n arguments if each pixel constitutes an argument and if the matrix has m lines and n columns. The number of arguments is decreased by effecting "local" or "neighborhood" operations. A neighborhood transformation defines the value of the pixel transformed solely as a function of the value of the original pixel and values of the associated pixels, taken in a constant arrangement around the pixel considered. This constant arrangement constitutes a slide window related to the point to be transformed. The pixels can have their value in one or several images. This value can be the value of the points before the transformation has been implemented: in this case, it pertains to a parallel transformation. The structuring element is not necessarily comprised of the immediate neighbors of the point to be transformed. With the notion of immediate neighbors being thus defined through the use of a neighborhood graph, the different types thereof will now be examined.

As an example, the principal neighborhood graphs encountered in practice will now be given.

Square array:

Two neighborhood graphs are currently utilized. They correspond respectively to a four connexity and an eight connexity.

In the case of the four connexity, each pixel x has four neighbors $x_1, x_2, x_3, x_4$, distributed as follows:

The distances d between the pixel considered x and each of the neighboring pixels are all equal.

In the case of an eight connexity, each pixel x has eight neighbors, $x_1, \ldots, x_8$ in the following distribution:

In this case, the distance between:

the pixel considered x on the one hand, each of pixels $x_1, x_2, x_3, x_5, x_7$, on the other hand, has a value $d1=5$, the pixel dx on the one hand, each of pixels $x_2, x_4, x_6, x_8$, on the other hand, has a value $d2=7$.

These distances are in the ratio of $7/5=1.4$, close to $\sqrt{2}$.

Hexagonal frame:

In this case, a six or twelve connexity can be adopted.

In the first case, each pixel has six neighbors $x_1, \ldots, x_6$, all equidistant from the pixel considered x:

In the case of the twelve connexity, each pixel has twelve neighbors $x_1, \ldots, x_{12}$ distributed as follows:

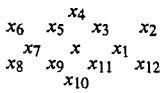

In this case, the distances between x and all odd index points are equal and have a value of $d1=4$; the distances between x and all even index points have a value $d2=7$. As such, the ratio between these two distances is 1.75, close to $\sqrt{3}$.

In the description of the invention, for the sake of simplicity, examples given will be limited to those corresponding only to specific connexities which are typical. But it will be seen that the invention in all cases can be transposed to various possible patterns and connexities.

Neighborhood transformations are conventionally effected by parallel processing. Transformation is done on all points of the image, independently from each other. Arguments $(a_{j-1, j-1}, \ldots a_{i+1, j+1}, \ldots)$ taken into account in the transformation of pixel $a_{ij}$ are always the values of the pixels in the neighborhood in the initial image. Each of the new pixel values are stored, i.e., value $a^*_{ij}$ for pixel $a_{ij}$, but no transformed pixel is utilized before the transformation has been done for all of the m·n pixels.

This method of transformation presents an advantage which, up to now, has led technicians to adopt in on a virtually exclusive basis: the subjacent algorithms are conceptually simple and it is easy to design a device to implement them. Moreover, the result of the transformation is independent of the mode of image scanning, which allows the usual image scanning method to be used, as well as conventional address generators. But it was not fully appreciated that each transformation taken on an isolated basis is inefficient and in general a great number of successive passes is necessary before the final result is obtained. To reach higher speeds, the processors in a same device must be multiplied, which makes it complex and highly expensive.

Conversely, sequential transformations described in the aforementioned Rosenfeld et. al. article present the characteristic of providing a result which depends on the mode and direction in which the initial image is scanned. If, for example, the initial digital image is explored using a conventional rester scan which will be called "direct video scanning" i.e., line by line, from left to right and top to bottom, a sequential transformation gives, from the initial pixel $a_{ij}$ on, the transformed pixel $a^*_{ij}$:

$$a^*_{i,j}=f[(a^*_k)_{k \epsilon P(i,j)}, a_{ij},(a_k)_{k \epsilon F(i,j)}] \quad (1)$$

Clearly, each time a pixel is transformed, its new value (rather than its value in the initial image) is used as an argument to transform the subsequent points which contain it in their structuring element.

Formula (1) corresponds to scanning in the direct video direction. In this formula, $(a^*_k)$, $k \epsilon P(i,j)$ is the family of points in the neighborhood of $a_{ij}$ which have already been encountered during the scanning of the image before pixel $a_{ij}$ and as such have already acquired their new value.

Conversely, $(a_k)_{k \epsilon F(i,j)}$ designates the group $F_{ij}$, the family of points in the neighborhood of the pixel considered $a_{ij}$ which have not yet been encountered during the scanning of the image at the time pixel $a_{ij}$ is being processed.

The algorithm corresponding to the sequential transformation in the inverse video scanning direction, i.e.

$$a_{mn}, a_{m,n-1}, \ldots, a_{m1}, a_{m-1,n}, \ldots, a_{m-1,1}, \ldots, a_{2n}, \ldots, a_{12}, a_{11}$$

ensues directly from formula (1).

SUMMARY OF THE INVENTION

The invention makes use of the finding that it is possible, by effecting a series of sequential transformations, and by inverting the direction of the scan for each new transformation, to obtain a result equivalent to that of a much longer sequence of parallel transformations. Better yet: in most cases, the result is obtained after a fixed number of scans independent from the content of the image: the fixed number is most often equal to 2 (one direct end or reverse scan ) or 3.

Consequently, the invention provides a process for the transformation of an image defined by pixels, each presenting a characteristic, such as a brightness, defined by a digital value, with the pixels being distributed according to a matrix and their relations and distances established by a predetermined neighborhood graph; part of the image is explored according to a predetermined scanning mode and the value of each pixel is modified as a function of the values of a set of associated pixels, which assume their value in at least one image and are located inside a slide window related to the pixel to be transformed, identical to all of the pixels and constituting a structuring element, wherein the transformed version of each pixel is immediately substituted for the previous value in an image memory and in that, after symmetry or rotation of the structuring element, the same transformation is repeated, using a scan in the direction opposite the previous scan.

It will often be advantageous to temporarily store the transformed pixels in a local memory so that they can be used to effect the transformation of the neighborhood on at least one point following the scan.

The above defined process can be qualified as involving the immediate rewriting of the new value $a^*_{ij}$ immediately after it is calculated.

The above defined process can be incorporated into numerous, more complex, transformations and into types of scanning other than conventional scanning by line and frame (rester scanning), especially scans along diagonals in the image. The process of transformation with rewrite can especially be incorporated into processes of image erosion, determining of regional maxima, grain reconstruction and skeletonization. It can also be applied in the case where the digital image is a binary image, with the levels of quantification for each pixel being 0 and 1 only.

BRIEF DESCRIPTION OF THE DRAWINGS

The invention will be better understood from the following description below of specific embodiments, provided as nonlimitative examples. The description refers to the accompanying drawings, in which:

FIGS. 4 and 5 show, as examples, and for the same set X, the euclidian ERODE function and the geodetic ERODE function conditionally for a specific set y, FIG. 6 is a block diagram of a processor for computing the geodetic ERODE function, FIG. 7 is a block diagram of a processor allowing grain reconstruction with rewrite, FIGS. 9A to 9E are drawings successively illustrating an initial binary image, the associated ERODE function, the associated RELIEF function, the marking of the peak lines to obtain a rough sketch of the skeleton and the return in the upstream direction following three sequential transformations, the first in the direct video direction, the second in the inverse video direction and the last in the direct video direction.

DESCRIPTION OF THE PREFERRED EMBODIMENTS

Figures 1, 2:
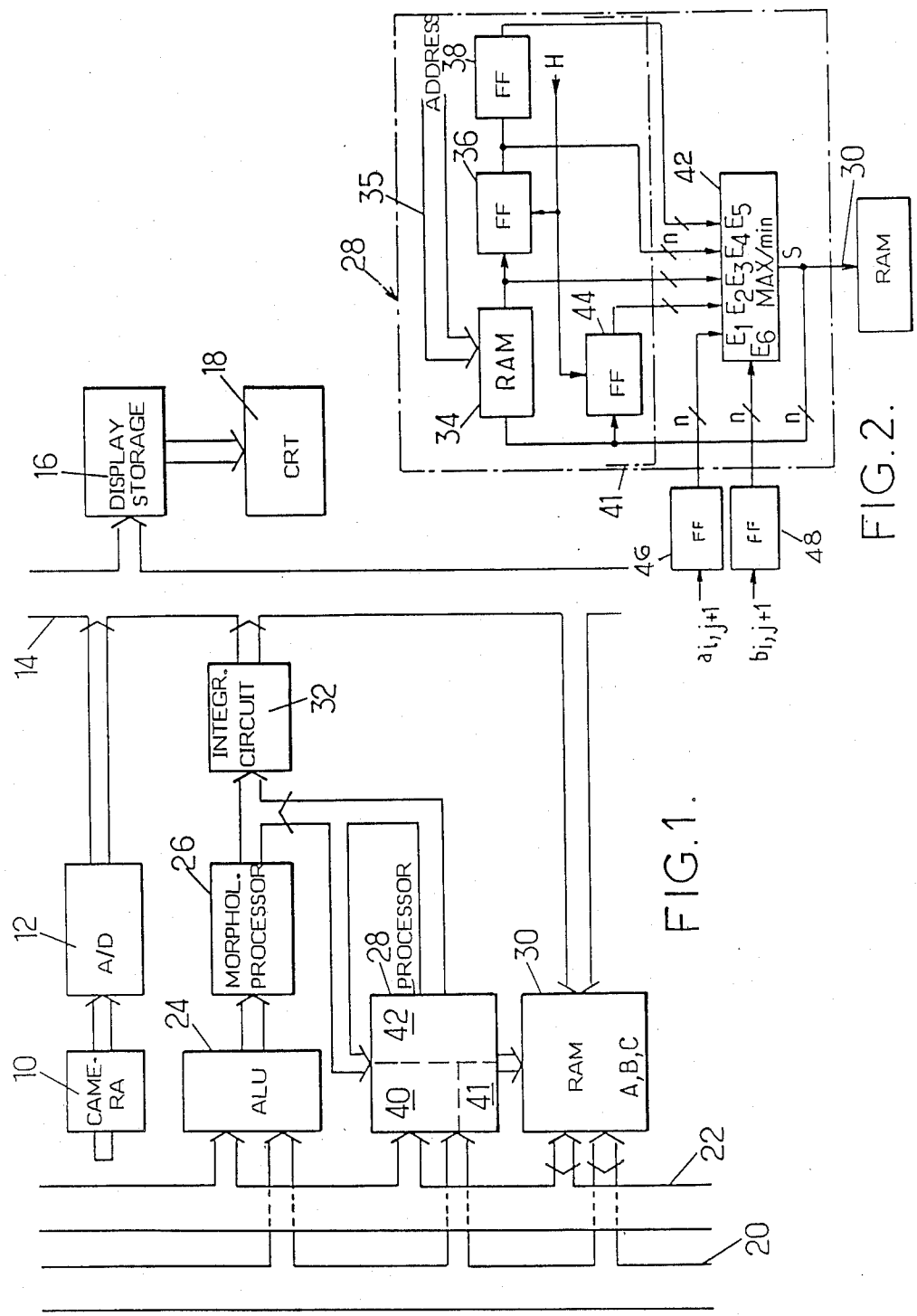
FIG. 1 is a block diagram showing the general architecture of an image analyzer allowing the implementation of the invention and comprising a rewrite processor.
FIG. 2 is a local storage and rewrite device for a sphere matrix which can be incorporated into the device in FIG. 1 to execute the ERODE function and grain reconstruction.

The invention can especially be implemented in an image analyzer having a conventional general design, such as that shown in FIG. 1, but having a morphological rewrite processor.

The analyzer in FIG. 1 comprises an image acquisition component 10 (camera or recording), whose output signals are digitized in a circuit 12, with each pixel being represented by a number comprised of several binary elements or "bits" (digital image). The signals are applied to a write bus 14 connected to a display memory 16 having a content corresponding to the number of pixels of an image to be provided on a display component 18 such as a cathode ray tube.

The analyzer comprises two identical read buses, which can be connected to other components, such as tape recorders, etc. The data circulating on these input busses is applied to an arithmetic and logical unit 24 which can effect operations of addition, subtraction, search for minimum and maximum among pixels. The outlet of the unit 24 is connected to a morphological neighborhood processor 26 which allows parallel transformations of the neighborhoods to be effected.

The read busses 20 and 22 are also connected to a morphological processor 28. The output of processors 26 and 28 is applied, using a common bus, to a circuit 32 whose role is to provide stop criteria for the rewrite processor. This circuit conducts an integral measurement. But a more advantageous stop test can be implemented in the processor itself, for all transformations which do not lead to the result in a fixed number of transformations. Indeed, it may consist of a comparator which compares the initial value to the transformed value of each pixel in turn. As long as a transformation couple in the direct direction, then in the inverse direction modifies a single pixel, a new transformation couple must be carried out. The comparator has as inputs the values of pixels $a_{ij}$ and $a_{ij}^*$ (former value and transformed value). The output of the comparator constitutes the input of a OR gate. The output of the OR gate is connected to the input of a flip-flop which can store one bit. The flip-flop is reset at the beginning of a transformation couple and set to 1 as soon as the two pixels $a_{ij}$ and $a_{ij}^*$ have different values. The output of the flip-flop is reinjected into the OR gate so that the flip-flop remains locked at 1 until the end.

Finally, the busses are connected to a random access memory 30 having sufficient capacity to store two or three complete images, which can be considered as occurring in three parts A, B, C.

So that the analyzer in FIG. 1 can implement the process according to the invention, the morphological processor 28 is comprised of two modules 40 and 42. The module 40 constitutes the rewrite device and has the function of presenting the module 42 which constitutes the processor with all of the arguments it needs to effect the transformation (1).

In order to minimize the number of <memory> accesses for the image <> 30, the rewrite device 40 advantageously comprises a local memory 41 in which all of the pixels are stored which have already served in the transformation of the pixels encountered before pixel $a_{ij}$ during the scan and which will still serve in the transformation of the pixels which follow pixel $a_{ij}$. In other applications, the local memory 41 is also designed to receive pixels at once before and after $a_{ij}$.

As soon as it is calculated by the processor 42, the new value $a^*_{ij}$ is recorded in the image memory 30 as well as in the local memory 41 of the device 40 so as to serve as an argument for the transformation of the subsequent pixels.

The composition of the rewrite processor 28 and its memory will depend on the type of frame and neighborhood graph adopted. FIG. 2 shows an assembly of the processor 28 which can be used when the scan is the video type in the direct and inverse directions, corresponding to a rectangular frame. But, as was indicated above, a hexagonal frame can be used.

In the case of direct video scanning, the values presented to the processor 42 must be:

$$a^*_{i-1,j-1} \; a^*_{i-1,j} \; a^*_{i-1,j+1} \quad (2)$$

$$a^*_{i,j-1} \; a_{i,j}$$

In the case of grain reconstruction, the value $b_{i,j}$ read from the memory B, is also presented to the processor 42.

The local memory 41 shown in FIG. 2 must simultaneously make available, for the processor 42, the pixel on which the transformation is being executed and four already transformed pixels. To do so, it comprises a random access memory 34, having a capacity corresponding to $n-1$ pixels. This memory can be a RAM addressed by the address bus 35. The output of data from the memory 34 drives two cascade mounted store elements 36 and 38, each having a capacity for a single pixel (generally flip-flops). The processor output 42 is connected to the memory 34 input and to the input of a memory component 44 having a capacity for a single pixel, as well as the memory 30 write bus.

Moreover, in the case shown, the memory 30 is also connected to store elements 46 and 48 whose capacity is for a single pixel.

It is seen that the outputs of memory 34 store elements 36, 38, 44, 46 and 48 allow the simultaneous presentation of the value of six pixels to the processor 42. These six values are applied to inputs E1, E2, ... E6. The transformation to be made determines the constitution of the processor 42, the distribution of the pixels stored in the store elements and that applied to the processor 42.

The assembly as shown allows the erosion function in square frame and grain reconstruction to be achieved, as will be seen below in greater detail.

The following can especially be present in a simultaneous manner, at the output of the various elements:

for the store element 46 for pixel $a_{ij}$, simultaneously with the reading of pixel $a_{i,j+1}$ in part A of the memory and transfer to 46, for the store element 48 for pixel $b_{ij}$, simultaneously with the reading of pixel $b_{i,j+1}$ in part B of the memory, As for the other elements, they provide the following when $a^*_{i,j}$ is applied to 34 and 44:

for the store element 44, aready transformed pixel $a^*_{i,j-1}$;

for memory 34, already transformed value $a^*_{i-1,j+1}$;

for the store element 36, already transformed value $a^*_{i-1,j}$;

for the store element 38 already transformed value $a^*_{i-1,j-1}$.

The operations are synchronized by a clock signal H issuing from the system's time base.

During the scan in the opposite direction, the structuring element associated with $a_{ij}$ undergoes a symmetry with respect to point aij. Thus, the store element of the device 41 which contained pixel $a_{1,s}$ during the direct scan now contains pixel $a_{2i-1,2j-s}$.

Some of the most important of the various devices which each allow a specific transformation to be effected will now be described.

ERODE function

The ERODE function is already known. J. SERRA, "Image analysis and mathematical morphology", Academic Press, 1982, pp. 43–45 can be consulted for the definition of erosion, and the aforementioned Rosenfeld article, for a definition of the ERODE function under the name "distance transformation".

Here, it is sufficient to remember that the ERODE function for a binary image X, conditionally for a binary image Y, is a digital function, which is designated by $ERODE_Y(X)$ and which is defined perfectly by its successive thresholds. With Sn being the level n threshold for the function $ERODE_Y(X)$, it is defined by the recurrence relation:

$$S_o = X \cup Y$$

$$S_n = (S_{n-1} \theta H) \cup Y, ou \theta H$$

where $\theta H$ represents the smallest degree of erosion by a surface isotropic element.

Figure 3:
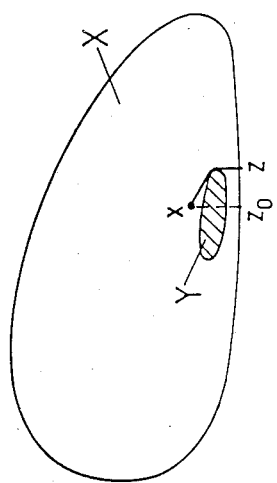
FIG. 3 is a diagram intended to show the difference between the euclidian distance and the geodetic distance.

When Y is not an empty set, $ERODE_Y(X)$ represents the length of the shortest path going from x to $X^C$ and bypassing Y, i.e., in FIG. 3 the path from x to z.

A special case is that in which the set Y is empty. In this case the geodetic distance is to the euclidian distance $xz_o$ of x (FIG. 3).

FIGS. 4 and 5 show, as an exmple, in square frame and for the same complex X, the euclidian ERODE function (FIG. 4) and the geodetic ERODE function, conditionally for a Y set comprising four pixels in a square arrangement (FIG. 5).

Before describing the implementation of the process using a device having the composition shown in FIGS. 1 and 2, a detailed explanation of the processing procedure will be given for the specific case of a square pattern, in eight connexity and with real distances between pixels, with adaptation for another frame or to another connexity being immediate.

In the most general case, the process must allow the geodetic ERODE of a binary complex X to be determined conditionally for a binary complex Y. In a preferred (though nonlimitative) implementation of the process, allowing calculations to be simplified, an initialization is done consisting of encoding the initial image to create a transformed initial digital image F such that:

| | |
|---|---|
| F(x) = Max | if x∈ Y |
| F(x) = Max − 1 | if x∈ X∩Y$^C$ |
| *-continued* | |
| F(x) = 0 | if x∈ X$^C$∩Y$^C$ |

With Max designating the maximum available value $2^s$ and $Y^C$ being the complement of Y.

The current part of the process consists of repeating a group of two successive passes, with the first pass being in the direct video direction and the second in the inverse video direction.

In the euclidian case, two successive passes are sufficient to obtain the result.

In the geodetic case, on the contrary, the succession must be repeated until stability, i.e., until two additional passes no longer modify any points, which involves a test.

During each pass, the configuration of the neighborhood, with a square pattern, is assumed to be as follows:

| | | |
|---|---|---|
| $a_{i-1,j-1}$ | $a_{i-1,j}$ | $a_{i-1,j+1}$ |
| $a_{i,j-1}$ | $a_{i,j}$ | $a_{i,j+1}$ |
| $a_{i+1,j-1}$ | $a_{i+1,j}$ | $a_{i+1,j+1}$ |

The rules for the transformation of each point in this case, for direct video scanning are as follows:

if:

$a_{i,j}$=Max, $a^*_{i,j}$=Max otherwise:

$a^*_{i,j}$=Min[$a_{i,j}$, 5+Min($a_{i-1,j}$, $a_{i,j-1}$), 7+Min($a_{i-1,j+1}$, $a_{i-1,j-1}$)]

Conversely, the following applies during an inverse video scan:

if:

$a_{i,j}$=Max, $a^*_{i,j}$=Max otherwise:

$a^*_{i,j}$=Min[$a_{i,j}$, 5+Min($a^*_{i,j+1}$, $a^*_{i+1,j}$) 7+Min($a^*_{i+1,j-1}$, $a^*_{i+1,j+1}$)]

In the case of a hexagonal pattern, the value $a^*_{i,j}$ (when $a_{i,j}$ is not equal to Max) is different, the following can be adopted:

$a^*_{i,j}$=Min[$a_{i,j}$, 1+Min (d*, e*, g*)]

Or else:

$a^*_{i,j}$=Min[$a_{i,j}$, 4+Min(d*, e*, g*), 7 (c*, b*, f*)]

where b, c, d, e, f, g, are arranged as follows during the direct scan:

| | | | |
|---|---|---|---|
| . | b | . | |
| c | d | e | f |
| g | $a_{i,j}$ | . | | with the arrangement being inverted for the inverse video scan.

It must be noted that, as compared with the Rosenfeld article mentioned above, the introduction to two different distances between two adjacent points on horizontal and vertical lines on the one hand and on diagonal lines on the other hand, constitutes an important innovation, because it allows a much more faithful representation of the distances to be obtained.

As such, the process can be implemented using the device shown in FIGS. 1 and 2, with device 40 presenting to the processor 42 the following neighborhood during the direct video scan (with E1 to E5 designaating the inputs of 42):

$$\begin{array}{ccc} a^*_{i-1,j-1} & a^*_{i-1,j} & a^*_{i-1,j+1} \\ a^*_{i,j-1} & a_{ij} & \end{array} = \begin{array}{ccc} E_5 & E_4 & E_3 \\ E_2 & E_1 & \end{array}$$

and, during the inverse video scan:

$$\begin{array}{ccc} & a_{ij} & a^*_{i,j+1} \\ a^*_{i,j-1} & a^*_{i+1,j} & a^*_{i+1,j+1} \end{array} = \begin{array}{ccc} & E_1 & E_2 \\ E_3 & E_4 & E_5 \end{array}$$

The composition of the processor 42 can as such be that shown in FIG. 6, with the input E6 shown in FIG. 2 not being assigned.

The device 42 in FIG. 6 comprises two input branches. The first branch comprises an operator 52, comprised of a comparator controlling a multiplexer with two input lines, providing on its output the minimum of the two values applied to its input. These two inputs are those identified by E2 and E4 in FIG. 2. The output F1 and the operator 52 is sent to a correspondence table 54 which transforms F1 into F'1 defined by:

if F1<Max−5,

F'1=5+F1 otherwise,

F'1=Max.

The second branch has the same composition and executes the same operations on inputs E3 and E5 to provide a value F'2 if it is only that the correspondence table of this branch transforms F2 into F'2 defined by:

if F1<Max−7,

F'2=7+F2 otherwise,

F'2=Max.

Values F'1 and F'2 are applied to the two inputs of an operator 56 which provides at its output the minimum G of F'1 and F'2 and applies it to one of the inputs of a comparator 58 and a multiplexer 64.

The second input of the comparator 58 constitutes input E1 of the rewrite device 42. This comparator is such that it provides, on its output, a signal J equal to:
1 if E1 is lower than G
0 in the contrary case.

The signal J is applied to one of the inputs of a OR gate 60. The other input of gate 60 is connected to the output of a comparator 62 providing a signal if the inputs are equal. The output signal H of the comparator 62 is equal to 1 if E1=Max. In the contrary case, H=0. Consequently, it is seen that the output I of gate 60 is equal to J if H has a value of 0, thus if E1 is not equal to Max.

The output signal of gate 60 is applied to the multiplexer control input 64, whose second data input receives the signal E1. Gate 60 thus determines that of the inputs of the multiplexer 64 which is connected to its output, which constitutes output S of processor 42 connected to the write bus for writing into part B of memory 30, in the random access memory 34 and in the register 44.

The ERODE function by rewrite processing according to lines having any orientation It can be advantageous to design an architecture for image analysis using commercial integrated circuits having, in the same box, a processing component and a memory component. In this case, it is interesting to break down the processing of the image into independent tasks to be effected on a parallel basis, with a processor being dedicated for each independent task. The ERODE function lends itself well to such a breakdown into sequential linear transformations which are sequential, i.e., which utilize and modify only information contained in a line of predetermined orientation of the image. In this case, the processing will involve several passes, with each modifying the result of the previous pass and working in a different direction. For a given direction, the processing of each line of the image is independent of the processing of all the other lines. As such, each line can be processed by to a different processor, with all of these processors working in a parallel.

Another advantage of this method of operation is to allow much more isotropic structuring elements to be generated, introducing unusual directions (such as $\pi/2$ in a hexagonal grid). The taking into account of these directions in conventional video scanning would be very expensive because it would require the use of very large structuring elements.

It will now be demonstrated how an ERODE processing can be effected with line by line rewrite; for purposes of simplification to the euclidian case in a square pattern will be considered.

The initial image will be coded as follows (with the notations being those already utilized):

F(x)=Max if x∈x

F(x)=0 otherwise

Thus, each of the following directions is processed one after the other:

0, w/4, w/2, 3w/4, w, 5w/4, 3w/2, 7w/4 and, for each direction, the following algorithm is executed:

$$a^*_i = \text{Min}(a^*_{i-1} + k_j, a_i)$$

where $k_j$ represents the distance between two consecutive pixels for the exploration direction j, i.e., for example k=5 for directions 0, $\pi/2$, $\pi$, $3\pi/2$; k=7 for directions $\lambda/4$, $3\pi/4$, $5\pi/4$, $7\pi/4$ in square frame.

Figure 12:
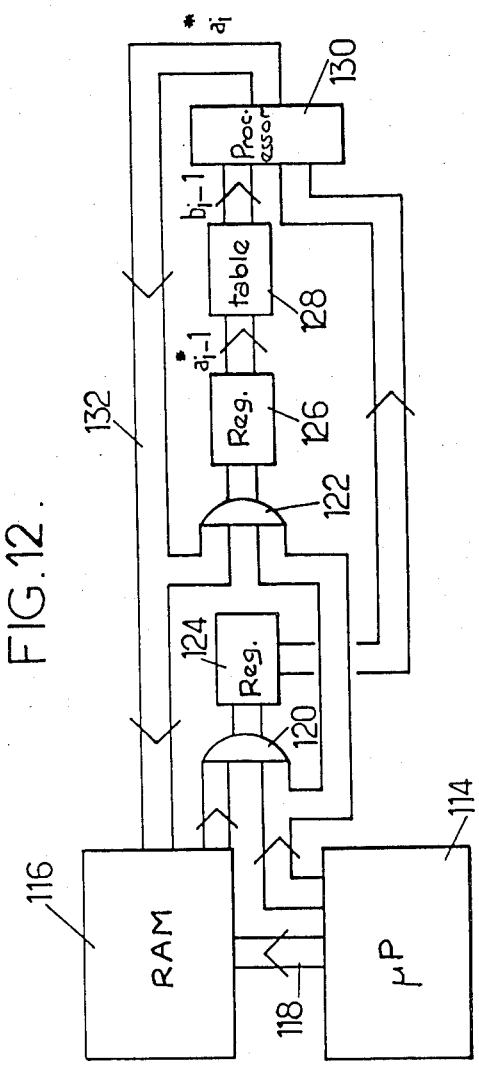
FIG. 12 is a block diagram showing an example of the direction by direction processing procedure.

To effect this transformation, one processor of the type represented in FIG. 12 can be utilized for each line.

This processor comprises a scanning microprocessor 114 and an accessible exploration random access image memory 116 and a pixel by pixel accessible random access image memory 116, connected to the microprocessor by an address bus 118. Since the exploration of lines having any orientation requires a more elaborate address generator than those normally utilized, a good solution consists of utilizing a microprogrammed microprocessor 114 in slices. The processor also comprises blocks 120 and 122 of AND gates, each driving a register 124 or 126. The register 126 is connected to a read table 128 having a role which is similar to that of the tables shown in FIGS. 10 and 11. Finally, a processor 130 receives the outputs of 128 and 124 and provides the minimum of the values received. An initialization input (not shown) allows the MAX value to be introduced into registers 124 and 128.

In steady operation, the memory 116 is read along a line in the direction chosen for the processing and the values of pixels $a_1, a_2, \ldots a_i, \ldots a_n$ are presented to the processor.

When the memory 116 presents the value $a_{i+1}$ to the register 124, the latter presents the value $a_i$ to the processor 130. The output of the processor 130 is written in image memory 116 as well as in the register 126 by the bus 132. The output $a^*_{i,1}$ of the register 126 undergoes an addition as follows in table 128:

if $$a^*_{i-1} \leq \text{Max} - k, \quad b_{i-1} = a^*_{i-1} + k$$

otherwise, $$b_{i,1} = \text{Max}$$

where
k=5 when dealing with processing directions: 0, w/2, w, 3w/2
K=7 in directions: w/4, 3w/4, 5w/4, 7w/4

The value $b_{1-1}$ constitutes the second input of the processor 130. It is seen that, as such, the aforementioned algorithm is implemented.

Grain reconstruction with rewrite

Grain reconstruction constitutes a transformation which is known in and of itself, a description of which can especially be found in the Serra book cited above, pp 401–403.

The result sought by the invention is to effect a digital reconstruction of the grains of a digital image A based on a digital image B.

To do so, the implementation of the algorithm below is repeated until stability is reached:

$$a' = \text{Min}[A \oplus H, B]$$

where A' is substituted for A for the subsequent operation and H is the elementary hexagon (or square) in the pattern.

The rewrite algorithm below allows the same result to be obtained with a much smaller number of passes than with the conventional algorithm.

The implementation device may also be that shown in FIGS. 1 and 2, but with a processor 42 of a different composition than that shown in FIG. 6.

In the specific case of a square pattern in eight connexity, the processor 42 can have the constitution shown in FIG. 7. Since the neighborhood is that already defined in (2) above, the following transformation must be made:

$$a^*_{ij} = \text{Min}[b_{ij}, \text{Max}(a_{ij}, a^*_{i,j-1}, a^*_{i-1,j+1}, a^*_{i-1,j}, a^*_{i-1,j-1})] \quad (3)$$

in direct video scanning.

In inverse video scanning, the neighborhood is inverted and the transformation to be made on each pixel of the digital image A is done according to the algorithm:

$$a^*_{ij} = \text{Min}[b_{ij}, \text{Max}(a_{ij}, a^*_{i,j+1}, a^*_{i+1,j}, a^*_{i+1,j-1})] \quad (3\text{bis})$$

To do so, the processor 42 must receive the following inputs in direct video scanning:

$b_{ij}$ sur E6

(where b designates a pixel in part B of the memory containing image B)

$a^*_{i-1,j-}$ on E5

$a^*_{i-1,j}$ on E4

$a^*_{i-1,j+1}$ on E3

$a^*_{i,j-1}$ on E2

$a^*_{ij}$ on E1

The presentation in inverse video scanning is deduced from the preceding by symmetry of the structuring element around $a_{ij}$.

The processor 42 comprises two input operators 66, each of which is comprised of a compartor followed by a multiplexer. The first operator 66, for example, receives inputs E2 and E3 and provides in its output a digital signal representative of the largest of the two values E2 and E3. The second operator 66 has the same composition but receives inputs E4 and E5. The outputs of the two operators are connected to two inputs of a second operator having the same constitution as the first, thus providing on its output a digital signal which is representative of the maximum of E2, . . . , E5. Another operator 70, which is identical to the preceding, comprises an input connected to the output of the operator 68 and a second input which receives E1. Consequently, the output F of the operator 70 represents the maximum of all values E1 to E5. A last operator 72 receives the output of the operator 70 and the signal E6, representative of $b_{ij}$, regardless of the scanning direction. The output S of the latter comparator, constituted by Min F (F, E6) is recorded in the image memory by the write bus and is reinjected into the memories 44 and 34 to serve in the processing of the subsequent pixels.

Skeletonization

The skeletonization of a group of pixels represented by binary numbers of digital functions constitutes one of the most widely used transformations in image analysis. It allows the median axis to be determined of a group of binary coded pixels or the "peak lines" of a group of pixels which can be considered as representing a digital function. A description of skeletonization and the devices conventionally used today may be found in the work by Serra cited above, on pages 373 to 401 and 450 to 456.

Prior methods of skeletonization are all based on the same principle: using successive passes, contour points are removed from each particle in the image for which the skeleton is being sought, which corresponds to successive thinning operations on the particle. Neighborhood criteria allow the disappearance of the particle to be avoided, with said particle being comprised of a group of pixels, or a hole, or to avoid dividing the particle or hole. The same is done for a set which can be represented by a digital function, while being certain that the same criterion is verified for all thresholds.

All known methods require a number of passes which increases with the size of the largest particles to be skeletonized in the image.

The process and device according to the invention, which will now be described, allow the operation to be simplified considerably: they allow the skeleton of a particle to be determined in a sequence which comprises:

a rapid preparation of the image,
 a skeletonization in three passes (effected, for example, with the first being direct video scanning, the second inverse video scanning and the third direct video scanning).

Now, the description will be given, first of all, of the general skeletonization sequence, then, in a detailed manner, the case of the construction of the euclidian skeleton of a group of binary pixels.

General procedure

The procedure can be regarded as comprising at least three stages (a) a relief without plateau is generated (b) the relief of the neighborhood of each pixel in the group to be skeletonized is possibly coded in acceptance with a predetermined coding algorithm, (c) the peak points are marked on the (possibly coded) relief and (d) on this same relief, the points upstream of the peak points are generated using a rewrite process such as defined above.

By way of example, the general process will be described while first assuming that the pixels are distributed in a pattern which is no longer square as in the previous cases, but hexagonal. The square pattern process is done in a very similar manner. The passage from a distribution in a square mesh to a hexagonal mesh can be done by parallel transformation which produces the following neighborhoods:
 on an even line:

$$\begin{matrix} & a_{i-1,j} & a_{i-1,j+1} \\ a_{i,j-1} & a_{i,j} & a_{i,j+1} \\ & a_{i+1,j} & a_{i+1,j+1} \end{matrix}$$

on an odd line:

$$\begin{matrix} a_{i-1,j-1} & a_{i-1,j} & \\ a_{i,j-1} & a_{i,j} & a_{i,j+1} \\ a_{i+1,j-1} & a_{i+1,j} & \end{matrix}$$

and, for a presentation which does not depend on parity, the neighborhood will be designated by $$\begin{matrix} a & b \\ c & d & e \\ f & g \end{matrix}$$

Figure 8:
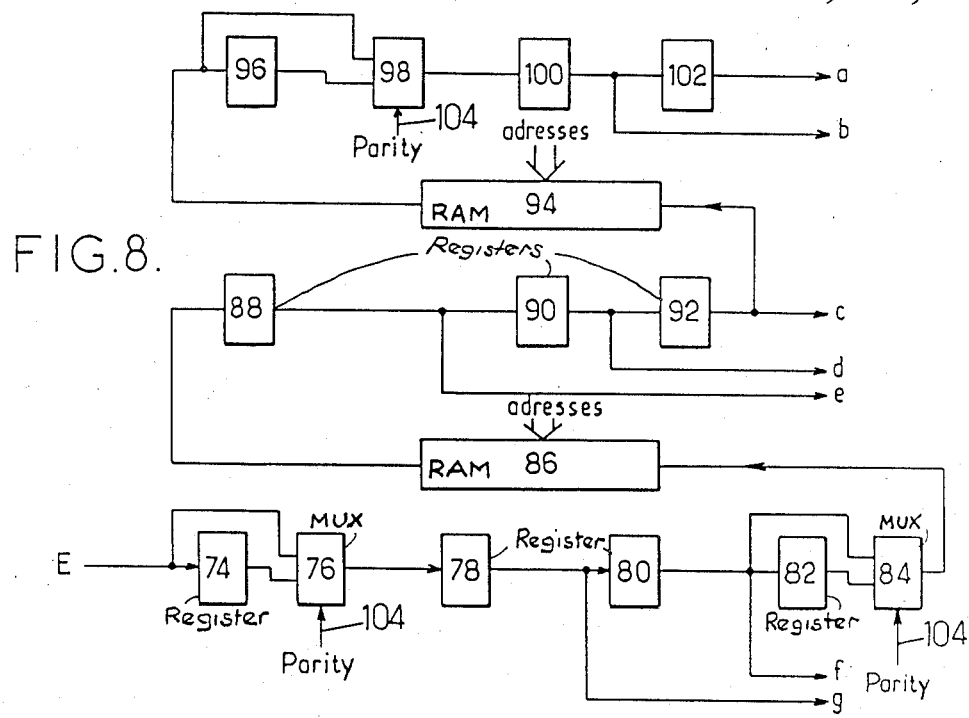
FIG. 8 is a drawing of a local storage device for hexagonal pattern parallel transformations.

This transformation can be done by using the device shown in FIG. 8, which comprises channels operating in an alternating manner.

The device shown in FIG. 8 receives from the central memory 30, on input E, the value of each pixel and stores it until it is no longer utilized by any structuring element. It detects these values within the local memory at each clock interval so as to prresent the processor 42 (FIG. 1) with the correct neighborhood (a, b, c, d, e, f, g) of the central point and regardless of the parity of the line processed. Indeed, it is noted on the two neighborhoods of $a_{ij}$ illustrated above that, when the line i is even, neighbors a and f (respectively b and g) have rank j (respectively j+1) while, for an odd line, they have rank J−1 (respectively j). To operate such a shift every other line, the device comprises three identical assemblies 74–76, 82–84, 96–98.

For example, the construction of the assembly 74–76 will be given in detail. It receives from memory 30, the value $a_{i+1,j+2}$, when $a_{i,j}$ is the central point of the structuring element. This input is applied simultaneously to the input of a register 74 and to one of the inputs of a multiplexer 76. The output of the register 74 constitutes the other input of the multiplexer. The multiplexer itself is controlled by a parity signal on its input 104. In an even line, the multiplexer presents on its output the input applied to E, or $a_{1+1,j+1}$, while, in an odd line, it takes the content of the register 74, or $a_{i+1,j+1}$. The output of the multiplexer 76 feeds two cascade mounted registers 78 and 80, each delaying the value of the pixel which it receives as input by one clock period. Thus, on an even line, the registers 78 and 80 will present in their output the values of the pixels $a_{i+1,j+1}$ and $a_{i+1,j}$ and, on an odd line, the values of pixels $a_{i+1,j}$ and $a_{i+1,j-1}$. It is noted that the correct values of points f and g, neighbors of central point d, are clearly present, in these outputs.

The assembly is to present, to the input of a random access memory 86, the value of pixel $a_{i+1,j-1}$, regardless of the parity of the line. To do so, the assembly 82–84 operates in opposition with the assembly 74–76: when the multiplexer 76 selects the input of register 74, the multiplexer 84 selects the output of register 82. Thus, their effects cancel each other out.

The random access memory operates like a delay register, introducing a delay of n-3 pixels.

The output of the random access memory 86, or $a_{i,j-2'}$, is injected into a cascade of three registers 88, 90 and 92 allowing each a clocked time delay of the value of the pixel which it received as input. The outputs of these three registers constitute the points neighboring $e=a_{i,j+1}$, $d=a_{ij}$, $c=a_{i,j-1}$.

The output of register 92, or $a_{i,j-1}$, is also connected to the input of a memory 94 which is identical to the memory 86.

The output of the random access memory 94, i.e., $a_{1-1,j+2'}$, constitutes the input of the last of the three register-multiplexer assemblies 96–98. The entire device 96-98-100-102 is identical to the device 74-76-78-80 and operates in a synchronous manner with the latter. The outputs of registers 100 and 102 thus constitute the last points in the neighborhood, b and a, which have the respective values $a_{i-1,j}$ and $a_{i-1,j-1}$, when the line being processed is odd.

Figure 8A:
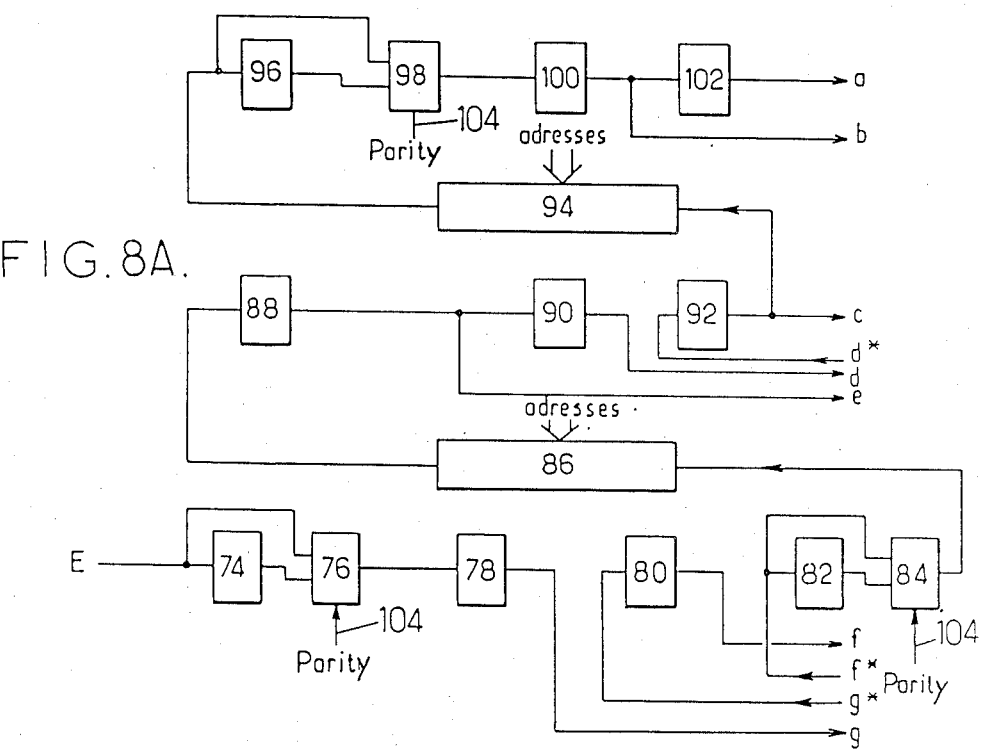
FIG. 8A is a block diagram showing the modification to be made to the device in FIG. 8 to execute a local storage and a triple rewrite for hexagonal sequential transformations.

This device is slightly more complicated than that which is normally utilized for the local storage of parallel hexagonal transformations. However, as presented, it has the advantage of the ability to transform easily into a rewrite device, by a simple modification of connections, as shown in FIG. 8A. In the device in FIG. 8, pixels g, f, d, read respectively at the output of registers 78, 80 and 90, are reinjected into the subsequent registers 78, 80 and 92. On the contrary, in the rewrite device in FIG. 8A, the transformed values g*, f* and d* are injected into the input of registers 80, 82 and 92, with said values having been calculated by the processor 42.

Henceforth, it can be noted that one can pass from the device shown in FIG. 8 to the rewrite device using a simple modification of the connections.

To correctly resolve edge of field problems, the useful image will be a sub-matrix $M_{n-2,n-2}$, begining at point $a_{22}$ so as to leave a complete frame around the image which the operator can figure as desired as a function of the transformation and the edge effects he wishes to produce.

After having thus described the passage from the square frame to the hexagonal frame, the general sequence of the process for obtaining the skeleton will be described, before beginning a detailed amount of the specific case of various binary euclidian skeletons.

The first step consists of executing a preparation of the image by generating a relief.

Case of a binary image: First of all, using the process described above under the heading "Erosion function", the ERODE function for the binary set X to be skeletonized is created conditionally for the potential binary set y (if one is working geodetically). This ERODE function allows the relief to be coded in the neighborhood of the pixel a of the set X to be transformed.

In the case of the following neighborhood:

$$\begin{array}{ccc} a_4 & a_3 & \\ a_5 & a & a_2 \\ & a_6 & a_7 \end{array}$$

This pertains solely to a local coding: the pixel a as well as all of its neighbor, having an altitude equal to that of a in the ERODE function, will be coded 1. Those whose altitude is above that of a are coded 2. Those whose altitude is below are coded 0.

Case of a digital image: On the ERODE function of the digital image, each pixel belonging to the set $X \cap Y^C$ has neighboring pixels lower than itself.

But this property is not true for a random function, which can present plateaus. To be able to construct the skeleton, first of all, a relief which is compatible with the relief ot the function representing the digital pixel set must be generated on these plateaus.

The simplest way to achieve this result consists of constructing the flow graph of the relief. The peaks of this graph are comprised of pixels, and the arcs (in the sense of a graph) from a pixel a indicate the neighbors of a towards which a drop of water placed in a would flow. These arcs are assigned in the following manner:
  for each pixel, an arrow is created, going from this pixel towards each of its neighbors smaller than itself,
  the flow graph is supplemented to take into account that the pixels which have not been assigned an arrow during the first stage are those inside plateaus; this is done by repeating, until stability is reached, the operation of creating arrow from a towards any neighboring pixel b for which
    the value of the function is the same for a and b,
    b is already the origin of an arrow, while a is not.

When the arrow generation operation is completed, the relief for the neighborhood of each pixel has been coded, as in the binary case. The central pixel and all of its neighbors which are not connected by an arc to the central pixel are coded 1.

Those of the neighboring components towards which an arrow exists stemming from the central pixel are coded 0.

Those of the neighboring components from which an arrow departs towards the central pixel are coded 2.

Once the coding of the relief is executed for the neighborhood of each pixel, the skeletonization properly speaking will be executed in two stages on the relief generated in the image, first the marking of the peak points, then the marking of the points upstream of the peak points in the ERODE function or the flow graph (the upstream point also belongs to the skeleton).

According to a modified embodiment, the relief is generated without plateaus during step (a) by the construction of an equivalent digital function on the flow graph in at least one couple of two passes:

(a1) the following transformation is done by direct video scanning on each pixel d of the initial relief B:

$$B^*(d) = \text{Min}[B(d), 1 + \text{Min}[C(a), C(b), C(c)]]$$

in which the arrangement of points a, b, c, d is that given during the presentation of the general procedure, as described previously, B is an auxiliary image initialized at the maximum objectal value available for the pixels, $$C(x) = \text{Max} - 1 \text{ if } A(x) > (d)$$

$$C(x) = B(x) \text{ if } A(x) = A(d)$$

$$C(x) = -1 \text{ if } A(x) < A(a)$$

for x=a, b or c, with pixel x being considered as having an altitude higher than pixel y if:

$$A(x) > A(y) \text{ or}$$

$$A(x) = A(y)$$

and, at the same time, $B(x) > B(y)$.

Marking of peak points

For this operation, a binary memory is used, initially containing 1's, zeroing all of the pixels belonging to a peak line of the image are zeroed in a single pass through the image.

To do so, the points are coded in the following manner:

(b1) pixel x and its neighbors having an altitude above x are coded 2,

Pixels neighboring pixel x having an altitude below x are coded 0,

Pixels neighboring pixel x having an altitude equal to x take all possible combinations of value 0 and 2 so as to obtain a family (Vi) or neighborhoods, During step c, a pixel x is considered as a peak point if there exits a neighborhood vj belonging to the family (vi) of x for which one of the following conditions is fulfilled:
  (i) all of the components neighboring the central pixel have the value of 0 and the zoning of the central pixel would eliminate a particle comprised of 2,
  (ii) the zeroing of the central pixel creates a bridge between two particles consisting of 0, which had no mutual connection in the x neighborhood;
  (iii) the zeroing of the central pixel eliminates the only connection existing between two particles consisting of 2 which have no other connection in the x neighborhood.

This signifies that a pixel a will be considered as a peak point if it enters into one of the following categories in the case of a hexagonal frame:

(i) a has at least four neighbors equal to 0 in the coding of the relief of its neighborhood, (ii) a has three neighbors equal to 0, but its neighborhood cannot be superimposed, directly to by rotation, over the configuration:

```
  2  .
 . a  0
  0  0
``` with a period (.) designating either a "one" or a "two".

(iii) a has two neighbors equal to 0, but its neighborhood cannot be superimposed, directly or by rotation, over the configuration:

```
  2  2
 . a  .
  0  0
```

(iv) a has one neighbor equal to 0, but its neighborhood cannot be superimposed, directly or by rotation, over the configuration:

```
  2  2
 . a  2
  0  .
```

In the binary euclidian case, the configurations of the peak points are equivalent to the following

```
   z  2
 x y 1 1          x, y, z, t taken in
   t  2           any angular position
```

```
                  x, and y taken with
                  any angular position,
   z  2̄           in which 2̄ designates
 x y ⌊1           that the corresponding
   t  2           pixel has a value of
                  1 or 0 but not 2
```

```
 y3 y2       0 0 0
 y4 x  y1 =  0 1 0    x taken in any angular
 y5 y6       0 0 0    position
``` which are shorter and, in certain cases, more advantageous.

In the case of eight (pattern) and eight (background) connexity, all pixels which do not verify any of the configurations will be considered as peak points:

```
.0.   000   000   000
2.2   0..   0.0   0..
222   .22   .2.   0.2

0.2   00.   000   00.
..2   ..2   ...   0.2
222   222   222   ..2
```

(in which the pixels marked . have a value of 1 or 2), or any of the configurations which are deduced therefrom by rotation or symmetry.

To the peak points above can be added the ends of the barbules. In the case, for example, of a square matrix, the configurations of peak points detected can be implemented with the ends of the barbules, i.e., the pixels which verify, in any angular position, at least one of the configurations:

```
.2.   2.0
0.0   ..0
000   000
```

The means to determine sections of the skeleton in square frame are directly derived from the above.

When the matrix is square and the neighborhood is in 4 connexity 4 for the pattern and in 4 connexity for the background, the neighborhood of each pixel is coded during step (b) in the following manner:

The central pixel and its neighbors having the same altitude are coded 1;

The neighbors having lower altitude are coded 2,

The pixels having lower altitude are coded 0. During step (c) all pixels which do not verify any of the following configurations are detected as peak points:

```
.0.   .00   000   00.   000   000
2.2   2..   ...   0.2   0..   0.0
222   222   222   .22   .22   .2.
```

(where the . signs indicate that the value of the pixel is 1 or 2) or any of the configurations which are deduced therefrom by rotation or symmetry.

In the case of eight connexity for the pattern and four for the background, all pixels which do not verify any of the following configurations are detected as peak points:

```
.0.   00.   00.   000   000
2.2   ..2   0.2   ...   0..
.2.   .2.   .2.   .2.   0.2
```

(where the . sign indicates that the value of the pixel is indifferent) or any of the configurations which ensue therefrom by rotation.

In all cases, for each of the peak pixels, the corresponding position in memory is zeroed.

Thus, a sketch of the skeleton is obtained, which will generally occur in several fragments. The entire upstream part of these fragments in the ERODE function or in the flow graph also belongs to the skeleton. This "upstream part" is defined in practice according to the same principles in all cases (euclidian binary, geodetic binary or digital). In a hexagonal frame, the twelve pixels closest to the pixel considered on which the determination of the relief is to be based are considered (with this pixel being a peak point of departure or a point which is "upstream" during a subsequent back generation).

Arrangement is as follows:

```
        v4
  v6 v5 v3 v2
  v7  a  v1
  v8 v9 v11 v12
       v10
```

For each of the vectors $av_i$ the slope is computed by dividing the difference in relief between $v_i$ and a by the distance $a v_i$.

As was seen earlier during the examination of the hexagonal matrix, the distance $v_i$ has the following value: 1 For the immediate neighbors $v_1$, $v_3$, $v_5$, $v_7$, $v_9$, $v_{11}$; $\sqrt{3}$ for the other neighbors $v_2$, $v_4$, $v_6$, $v_8$, $v_{10}$, $v_{12}$;

In order to have whole values in the $1/\sqrt{3}$ ratio, distances 4 and 7 will generally be adopted respectively.

The difference in relief $DR(v_{i,a})$ is:
  read on the ERODE function for the binary sets,
  deduced from the flow graph for the digital functions (grey level pixels).

Any pixel $v_i$ having an altitude above that of the pixel x and such that the slope of the vector $x_{vi}$ is greater than the slopes of $x_{vi+1}$ and $x_{vi-1}$ belongs to the "upstream" part of x. The application of this rule in the binary euclidian case ensures that the skeleton obtained is connected. The same does not necessarily apply in the case of a more general relief, and it is necessary to complete the skeleton during a last pass: if $v_i$ is the upper part of the pixel x without belonging to the hexagon $H_x$ having the size 1 centered on x, then x and $v_i$ have two common neighbors y and z belonging to $H_x$ which has the following configuration:

```
       v_i
      y  z
    . x  0
    . .
```

If neither y nor z belong to the skeleton, then that of the two points y and z having the highest altitude (both if they are equal in altitude) also belong to the skeleton.

Thus, based on peak points giving a sketch of the skeleton, the upper part can be constructed in three passes using a rewrite process which can implement the device shown in FIG. 8, taking into account a neighborhood of twelve points.

Specific case of the generating of the skeleton of a set of binary pixels, in the euclidian case (Y set empty).

Figures 9A, 9B:
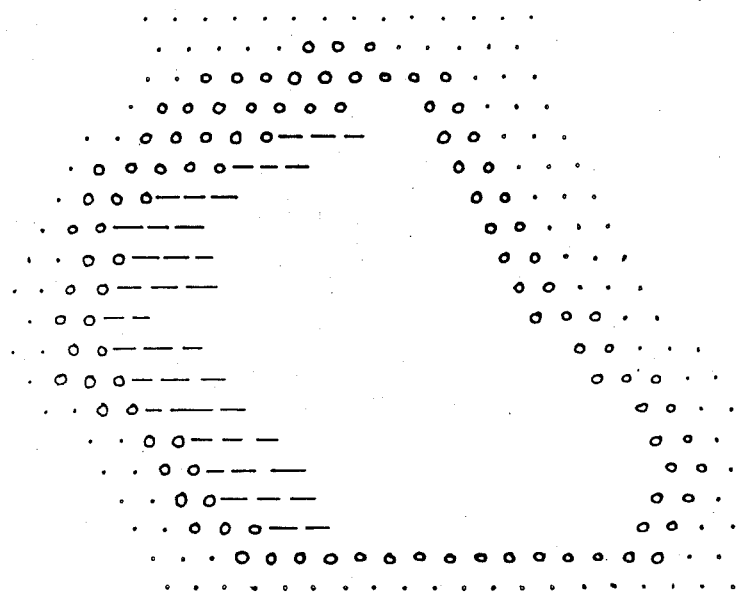
Figures 9D, 9E:
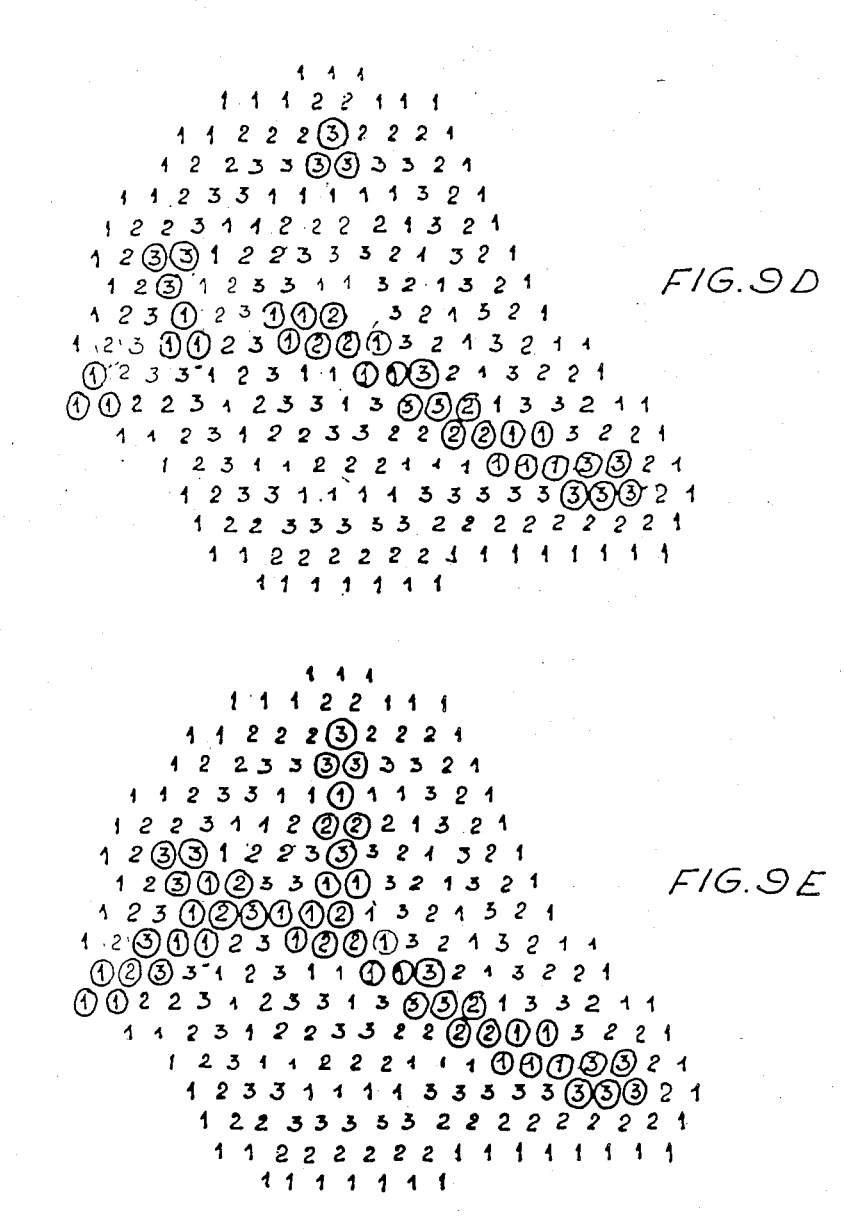

FIG. 9A shows, as an example, a binary set which can be considered as typical, with the circles indicating the pixels having one of the levels (that corresponding to the pattern), with the points indicating the pixels having the other level (that corresponding to the background).

The local structure of the relief can then be represented by a four-state RELIEF function, obtained from the ERODE function (shown in FIG. 9B):

RELIEF (a)=0 if $a \epsilon X^c$

RELIEF (a)=1+[2+ERODE(a), modulo 3]

in the contrary case.

In the above formula [N, modulo 3] signifies the congruence of N modulo 3, where N is the whole number equal to ERODE (a).

Thus, the representation in FIG. 9C is obtained.

It is important to note that, to be put generally, the skeleton can also be detected on the ERODE function; on the flow graph; or on the RELIEF function. Of the three representations, the RELIEF function has the poorest information, and this information is, however, sufficient to construct the skeleton in binary euclidian conditions. For the other cases in the figure, geodesic or digital, recourse must be made to the flow graph or the ERODE function.

Figure 10:
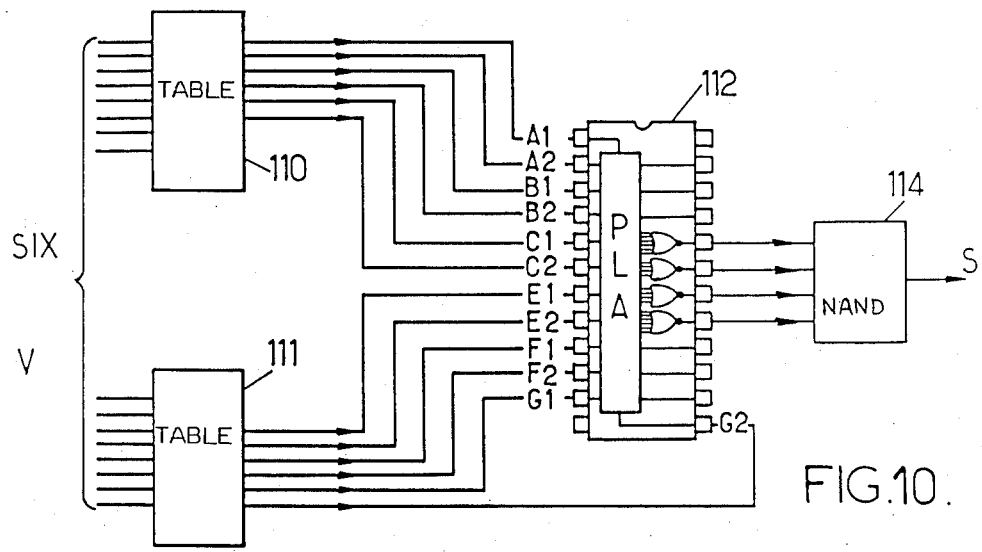
FIG. 10 is a block diagram showing a possible assembly of a device to detect skeletal peak points, FIG. 11, similar to FIG. 10, shows a possible embodiment of the device for the return in the upstream direction of the skeleton.
Figure 11:
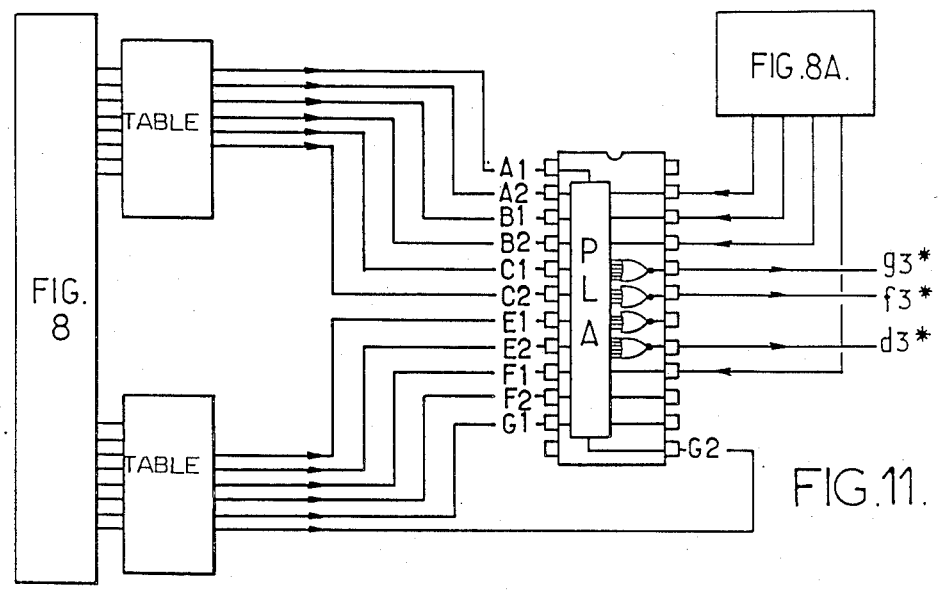

The circuit for the detection of peak points of the skeleton can be as shown in FIG. 10. This circuit comprises two correspondence or transcoding tables 110 and 111, each having eight inputs and six outputs. Each of these tables can be constituted by a 256 byte ROM.

Tables 110 and 111 are intended to recode the local relief around a central point a in the following manner:
  the central point and those of the neighboring points V which have a value equal to the central point are coded 1;
  the points having an altitude greater than the central pixel are coded 2,
  the points having an altitude lower than the central pixel are coded 0.

It is thus necessary to code each pixel on two bits, with the LSB being identified by index 2 and the MSB by index 1.

A third bit, marked with index 3, will indicate if the pixel considered belongs to the skeleton (if yes, bit 3 will have the value 0) or does not belong (and then bit 3 will have a value 1).

The correspondence between the new values V and the old values v (bits $v_i$ and $v_2$) is thus given by the following table (with a being the central point, v a neighbor of a):

| | | Initial values | | | | | | Final |
|---|---|---|---|---|---|---|---|---|
| | | (MSB) | (LSB) | | | | | Value |
| v | a | $v_1$ | $v_2$ | $a_1$ | $a_2$ | $V_1$ | $V_2$ | V |
| 0 | 1 | 0 | 0 | 0 | 1 | 0 | 0 | 0 |
| 3 | 1 | 1 | 1 | 0 | 1 | 0 | 0 | 0 |
| 1 | 1 | 0 | 1 | 0 | 1 | 0 | 1 | 1 |
| 2 | 1 | 1 | 0 | 0 | 1 | 1 | 0 | 2 |
| 1 | 2 | 0 | 1 | 1 | 0 | 0 | 0 | 0 |
| 2 | 2 | 1 | 0 | 1 | 0 | 0 | 1 | 1 |
| 3 | 2 | 1 | 1 | 1 | 0 | 1 | 0 | 2 |
| 2 | 3 | 1 | 0 | 1 | 1 | 0 | 0 | 0 |
| 3 | 3 | 1 | 1 | 1 | 1 | 0 | 1 | 1 |
| 1 | 3 | 0 | 1 | 1 | 1 | 1 | 0 | 2 |

The final value of a is 1 in all cases.

The circuit in FIG. 10 comprises a logical processing component 112 which receives the outputs of the two tables 110 and 111, representing the new value, coded on two bits, of each of the pixels neighboring the central point of the relief. The component 112 can be constituted of a programmable logic array (PAL 18L 4 port network, for example), each column of which provides a complemented input. In this programmable logic array, twenty AND gates having forty inputs are available. These forty inputs are the inputs (or the complemented inputs) of the programmable logic array. Each of these AND gates is capable of generating a structuring element. For example, the following neighborhood can be implemented on a neighborhood line:

$$\begin{matrix} & a & b & \\ c & d & e \\ & f & g & \end{matrix} = \begin{matrix} & 0 & 1 & \\ 1 & & 2 \\ & 2 & 2 & \end{matrix}$$

Which corresponds to the function:

$T1 = \overline{a_1} \cap \overline{a_2} \cap \overline{b_1} \cap b_2 \cap \overline{e_1} \cap e_2 \cap g_1 \cap \overline{g_2} \cap f_1 \cap f_2 \cap \overline{c_1} \cap c_2$ In this formula, a, b, c, e, f and g designate the six points neighboring the central point, from left to right and top to bottom, with $a_1$ and $a_2$ being the MSB and LSB bits, respectively.

Five other AND gates can be utilized to implement the structuring elements derived from the preceding by successive 60 degree rotations. In the last step of the programmable logic network, one obtains the value $s1 = (\overline{T1 \cup \ldots T6})$ present on output No. 17.

The six structuring elements R having the following form can also be made:

$$\begin{matrix} & 0 & 0 & \\ 1 & & & 1 \\ & 2 & 2 & \end{matrix}$$

ensuing from one another by 60 degree rotation.

The value $S_2 = \overline{R_1 UR_2 UR_3 UR_4}$ will be present in output No. 18 and $S_3 = \overline{R_5 UR_6}$ will be present on output No. 19;

The same applies for the structuring elements P having the shape:

$$\begin{matrix} & 0 & 0 & \\ 1 & & & 0 \\ & 2 & 1 & \end{matrix}$$

The value $S = \overline{(P_1 UP_2 U \ldots P_6)}$ will then be present on output No. 20.

Finally, the structing elements may be assembled by a NAND gate 114 operating receiving outputs Nos. 17, 18, 19, 20. The resulting signal S can be recorded in central memory and constitutes the third bit of the central point, equal to 0 if the pixel a is a peak point, 1 in the contrary case. Return in the upstream direction.

Upon completion of the preceding operation, there are only three sections of the skeleton present. To connect these sections and form the complete skeleton, it is necessary to return in the upward direction. This operation is done in three passes:

the first in the direct video direction for directions $-\pi/6, -\pi/3, -\pi/2, -2\pi 3, -5\pi/6$ the second in the inverse video direction for directions $\pi/6, \pi/3, \pi/2, -2\pi/3, -5\pi/6, \pi$ the last in the direct video direction for direction 0.

Only the first operation executed in direct video scanning will be described here, since the two others are deduced directly therefrom.

It suffices, for a neighborhood of size 1 and for each pixel a, to simultaneously have two relief bits $A_1$ and $A_2$ as well as bit $A_3$ indicating if a is a peak pixel or belongs to the upper part of a peak pixel.

To do so, bits 1 and 2 can be delayed in a parallel processing device such as that illustrated in FIG. 8.

On the other hand, the MSB undergoes a triple rewrite process.

In the neighborhood $$\begin{matrix} a & b & \\ c & d & e \\ f & g & \end{matrix}$$

the return in the upstream direction:
 in direction $-\pi/6$, can occur from c to g,
 in direction $-\pi/2$, can occur from b to g,
 in direction $-5\pi/6$, can occur from e to f,
 in direction $-\pi/3$, can occur from a to d,
 in direction $-2\pi/3$, can occur from b to d,
and all information on the local relief is found inside the size 1 neighborhood.

The return in the upward direction in directions $-\pi^6, -\pi/2, -5\pi/6$ is done with the same rules. For example, the ascent in the direction $-5\pi/6$ is done from e to f when:

e is an element of the skeleton, thus E3 has a value of 0, $$\begin{matrix} & d & e \\ f & g & \end{matrix} \text{ equals } \begin{matrix} & 1 & 0 \\ 2 & 1 & \end{matrix} \text{ or } \begin{matrix} & 1 & 1 \\ 2 & 1 & \end{matrix}$$

Then, bit F3 is given a value of 0, otherwise, its value is retained. This can be expressed by:

F3* $\leftarrow$ NOT($\overline{F3}$UXUY) with $X = \overline{E3} \cap \overline{E1} \cap E2 \# \overline{G1} \cap G2 \cap F1 \cap \overline{F2}$ $Y = \overline{E3} \cap \overline{E1} \cap \overline{E2} \cap \overline{G1} \cap G2 \cap F1 \cap \overline{F2}$ Possibly after a rotation, the ascent in directions $-\pi/3, -2\pi/3$ is done with the same rules. For example, the ascent from a to d occurs when:

a is an element of the skeleton, thus bit A3 has a value of 0, $$\begin{matrix} a & & \\ & d & e \\ f & & \end{matrix} \text{ equals } \begin{matrix} 0 & & \\ & 1 & 1 \\ 1 & & \end{matrix}$$

Then, bit D3 is assigned a value of 0, otherwise its value is retained. This is expressed by the function NON[$\overline{D3}$U[A3$\cap \overline{A1} \cap \overline{A2} \cap \overline{F1} \cap F2 \cap \overline{E1} \cap E2$]]

The overall group of logical functions expressing the return in the upstream direction in different directions can be implemented for example, by using a unit of the type already illustrated in FIG. 10, but associated with the devices shown in FIGS. 8 and 8A. Such an arrangement is shown diagrammatically in FIG. 11.

It is possible (and advantageous in certain cases) to return in the upstream direction only one direction at a time, and to repeat the return in the upstream direction for each of the four, six, eight or twelve directions of the matrix.

Finally, the skeleton can be completed in all points where a point of the skeleton and its upper point are not connected by a path of contiguous points of the skeleton by adding the contiguous points which constitute such a path having a minimum length.

What is claimed is:

1. Process for skeletonization of an image made up of a matrix of pixels, wherein each of the pixels constitutes a central pixel in a neighborhood consisting of a predetermined plurality of pixels adjacent to the central pixel, each of the pixels in said matrix presenting a characteristic feature, such as a brightness, defined by a digital value, said method comprising the steps of:

(a) transforming said image by eliminating its plateaus to generate a relief without plateaus;

(b) coding said relief without plateau in the neighborhood of each of said pixels according to a predetermined coding algorithm to provide a coded relief represented by coded values;

(c) marking peak points on said coded relief, said peak points belonging to a skeleton of shapes in said image; and (d) starting from said peak points, generating upstream parts of said skeleton by a re-write transformation including: (d1) a first scan of the image in a direct direction, during which a value is selected for each pixel in the image which is responsive to values of a set of pixels within a structuring element associated with the pixel whose value is to be selected and identical for all pixels; the selected value of each pixel is immediately substituted for the coded value in a image memory, whereby the pixel values in said structuring element include coded values and already selected values; and (d2), after symmetry or rotation of the structuring element, repeating step (d1) using a reversed direction scan, at least once.

2. Process according to claim 1, wherein said digital value of each pixel is binary and, during step (a), the plateaus are eliminated by generating an ERODE function of the image.

3. Process according to claim 2, wherein said digital value is binary and the relief is coded as a RELIEF function having any one of four values defined as:

$$RELIEF(x)=0 \text{ if } ERODE(x)=0$$

$$RELIEF(x)=1+[ERODE(x)+2 \text{ modulo } 3] \text{ if not.}$$

4. Process according to claim 1, wherein, the digital value of each pixel being considered as an altitude of that pixel, the plateaus are eliminated during step (a) by construction of a flow graph in at least two passes, as follows:
   (a1) during a first pass, generating arrows each directed from a pixel x0 towards a pixel x1 in the neighborhood of pixel x0 when x0 has an altitude higher than the altitude of x1;
   (a2) during a second pass, generating additional arrows from each pixel x0 toward a pixel x1 in the neighborhood which has the same altitude as x0 when an arrow has already been generated starting from x1 and there is no arrow starting from x0,
   (a3) repeating subsequent passes until arrows are no longer created.

5. Process according to claim 1, wherein said plateaus are eliminated during step (a) by constructing a digital function having a specific value for each pixel from 0 to a predetermined maximum value of the digital values, said digital function being equivalent to a flow graph and being constructed in at least two successive passes:
   (a1) carrying out a direct video scanning of the matrix and carrying out the following transformation on each pixel d having a neighborhood:

$$\begin{array}{cc} a & b \\ c & d \end{array}$$

$$B^*(d) = \text{Min}\{B(d), 1 + \text{Min}[C(a), C(b) C(c)]\}$$

wherein: B is an auxiliary image initialized at said maximum digital value, and
$C(x)=\text{Max}-1$ if $A(x)>A(d)$,
$C(x)=B(x)$ if $A(x)=A(d)$,
$C(x)=1$ if $A(x)<A(d)$ for $x=a$, b or c
with pixel x being considered as having an altitude higher than a pixel y if:
$A(x)>A(y)$ or
$A(x)=A(y)$ and, at the same time, $B(x)>B(y)$.

6. Process according to claim 1, wherein, the digital value of each pixel being considered as an altitude of the respective pixel:
each pixel x of the matrix is coded as follows during step (b):
pixel x and the pixels in the neighborhood thereof having an altitude above pixel x are coded 2,
pixels in the neighborhood of pixel x having an altitude below pixel x are coded 0,
pixels in the neighborhood pixel x having an altitude equal to pixel x are given all possible combinations of values 0 and 2,
whereby a family (vi) of neighbors is obtained, for each pixel,
and, during step (c), a pixel x is considered as a peak point, if it has a neighborhood belonging to the family (vi) and for which one of the following three conditions is fulfilled:
all pixels in the neighborhood of pixel x are equal to zero and zeroing x would eliminate a particle consisting of 2s,
zeroing x would create a bridge between two particles consisting of 0s which had no mutual connection between themselves in the neighborhood of x,
zeroing x would eliminate the only connection existing between two particles consisting of 2 which have no other connection in the neighborhood of pixel x.

7. Process according to claim 1, wherein one subset only of all possible sets of peak points is retained during step (c) by applying an additional predetermined selection criterion.

8. Process according to claim 1, for transformation of an image made up of a square matrix of pixels, each pixel having a neighborhood which is defined with a four connexity when relating to a shape and a four connexity for background, wherein:
the neighborhood of each pixel is coded as follows during step (b):
each pixel at the center of a neighborhood of four neighboring pixels is coded 1 when said neighborhing pixels have the same digital value as the central pixel to be coded,
pixels having higher values than the central pixel in the neighborhood are coded 2; and
pixels having lower values than the central pixel in the neighborhood are coded 0;
and all pixels which do not verify any of the following configurations:

```
.0.    .00    000    00.    000    000
2.2    2..    ...    0.2    0..    0.0
222    222    222    .22    .22    .2.
```

(where the . signs indicate that the value of the pixel is indifferent)
nor any of the configurations deduced therefrom by rotation or symmetry, are detected as peak points during step (c).

9. Process according to claim 8, including the additional step of
   (c1) marking, as additional peak points, the pixels which verify at least one of the configurations:

```
.2.    2.0
.0.    ..0
000    000
```

(where the . signs indicate that the value of the pixel is indifferent)
or any of the configurations deduced therefrom by rotation, such additional pixel representing ends of barbules.

10. Process according to claim 6, wherein pixels $x_1$ are marked as being upstream from previously marked peak pixel x if the altitude of $x_1$ is greater than that of x, and
if, in a predetermined structuring element surrounding x and including a plurality of pixels, vector $x_0x_1$ has a slope greater than slopes of two vectors having x as an origin, having as an end pixels of the structural element and close to $x_1$.

11. Process according to claim 10, for generating a geodetic skeleton, wherein the pixels upstream of the peak pixel are determined along a first direction of the matrix at a time, successively for each direction of the matrix.

12. Process according to claim 1, further including the step of completing the skeleton in all areas where a first pixel of the skeleton and a second pixel of the skeleton upstream of the first pixel are not connected by a path by inserting into said skeleton mutually adjacent points of the matrix which constitute a path of minimum length between the first and second pixels.

13. Process according to claim 1, wherein, with matrix being square and the image comprising particles which can present barbules whose ends are not part of the peak points, during step (c) in addition to the peak points, the pixels are detected having a number of neighbors whose altitude is lower than their own, greater than a predetermined number, so as to retain the pixels constituting the end of the barbules.

14. Process according to claim 6, wherein, with the matrix being hexagonal, the neighborhood of each pixel is coded during step (b) in the following manner:

pixel x and its respective neighbors having the same altitude are coded 1;
the respective neighbors having a higher altitude are coded 2,
the pixels having lower altitude are coded 0 and in that during step (c) all pixels which do not verify any of the following configurations are detected as peak points:

$$\begin{matrix} 2 & . \\ . \ 1 \ 0 \\ 0 \ 0 \end{matrix} \quad \text{or} \quad \begin{matrix} 2 \ 2 \\ . \ 1 \ . \\ 0 \ 0 \end{matrix} \quad \text{or} \quad \begin{matrix} 2 \ 2 \\ . \ 1 \ 2 \\ 0 \ . \end{matrix}$$

(where the pixels represented by . have the value of 0, 1 or 2) or any of the configurations which are deduced therefrom by rotation.

15. Process according to claim 6, wherein, with the matrix being hexagonal, and with binary euclidian, pixels whose neighborhood is as follows are detected as peak points, with a close rotation:

$$\begin{matrix} 0 \ 0 \\ 0 \ 1 \ 0 \\ 0 \ 0 \end{matrix} \quad \text{or} \quad \begin{matrix} . \ 2 \\ . \ 1 \ 2 \\ . \ 2 \end{matrix}$$

(where 2 indicates that the pixel in question has a value of 0 or 1 but not 2)

and four points are also detected as peak points at once when they present the following configuration:

$$\begin{matrix} 2 \\ 1 \ 1 \\ 2 \end{matrix}$$

16. Process according to claim 6, wherein the matrix being square and each pixel having a neighborhood which is defined with 8 connexity when relating to a shape and 4 connexity for background, all of the pixels which do not verify any of the following configurations are detected as peak points:

```
.0.    00.    00.    000    000
2.2    ..2    0.2    ...    0..
.2.    .2.    .2.    .2.    0.2
``` where the . signs indicate that the value of the pixel is indifferent)
or any of the configurations deduced therefrom by rotation or symmetry.

17. Process according to claim 6, wherein, with the matrix being square, and each pixel having a neighborhood with 8 connexity for shape and background, all pixels which do not verify any of the following configurations are detected as peak points:

```
.0.    000    000    000
2.2    0..    0.0    0..
222    .22    .2.    0.2

0.2    00.    000    00.
..2    ..2    ...    0.2
222    222    222    ..2
```

(where the . signs indicate that the value of the pixel is indifferent) or any of the configurations deduced therefrom by rotation or symmetry.

* * * * *